Aug. 9, 1960 C. J. AFFELDER 2,948,860

AUDIO LEVEL GOVERNING DEVICE

Filed Dec. 11, 1957

Charles J. Affelder
INVENTOR

BY H. L. Godfrey
ATTORNEY

United States Patent Office 2,948,860
Patented Aug. 9, 1960

2,948,860

AUDIO LEVEL GOVERNING DEVICE

Charles J. Affelder, 7704 Marbury Road, Bethesda, Md.

Filed Dec. 11, 1957, Ser. No. 702,214

7 Claims. (Cl. 330—134)

(Granted under Title 35, U.S. Code (1952), sec. 266)

The invention described herein may be manufactured and used by or for the Government of the United States for governmental purposes without the payment to me of any royalty thereon in accordance with the provisions of 35 U.S.C. 266.

The invention relates to a control circuit for providing control voltages for volume expander or compressor circuits, and has a particular applicability in connection with automatic audio gain control at remote short wave relay stations and in any other case where the signal-to-noise ratio may be relatively low.

An object of the present invention is to eliminate one or more of the disadvantages existing in presently known systems. Another object of the invention is to provide a control voltage of such character as to maintain the output program level substantially constant for varying input program levels. A further object is to provide a gain control circuit which will produce normal gain in the absence of program input or with normal signal input, decreasing gain for signals of higher strength than normal and an increasing gain for signals of lower strength than normal.

The foregoing and related objects are accomplished by the invention which comprises a means for providing the same output in the presence of the normal level of program input or in the absence of program input, having a first delay means for increasing the output when the input level drops below the normal level and a second delay means for decreasing the output when the input level rises above the normal level. The respective outputs are separated and applied to control the gain of the program passing through the short wave relay.

Other and further objects and advantages of the invention will become more apparent from the following description, reference being had to the accompanying drawings in which.

Figures 1, 2:
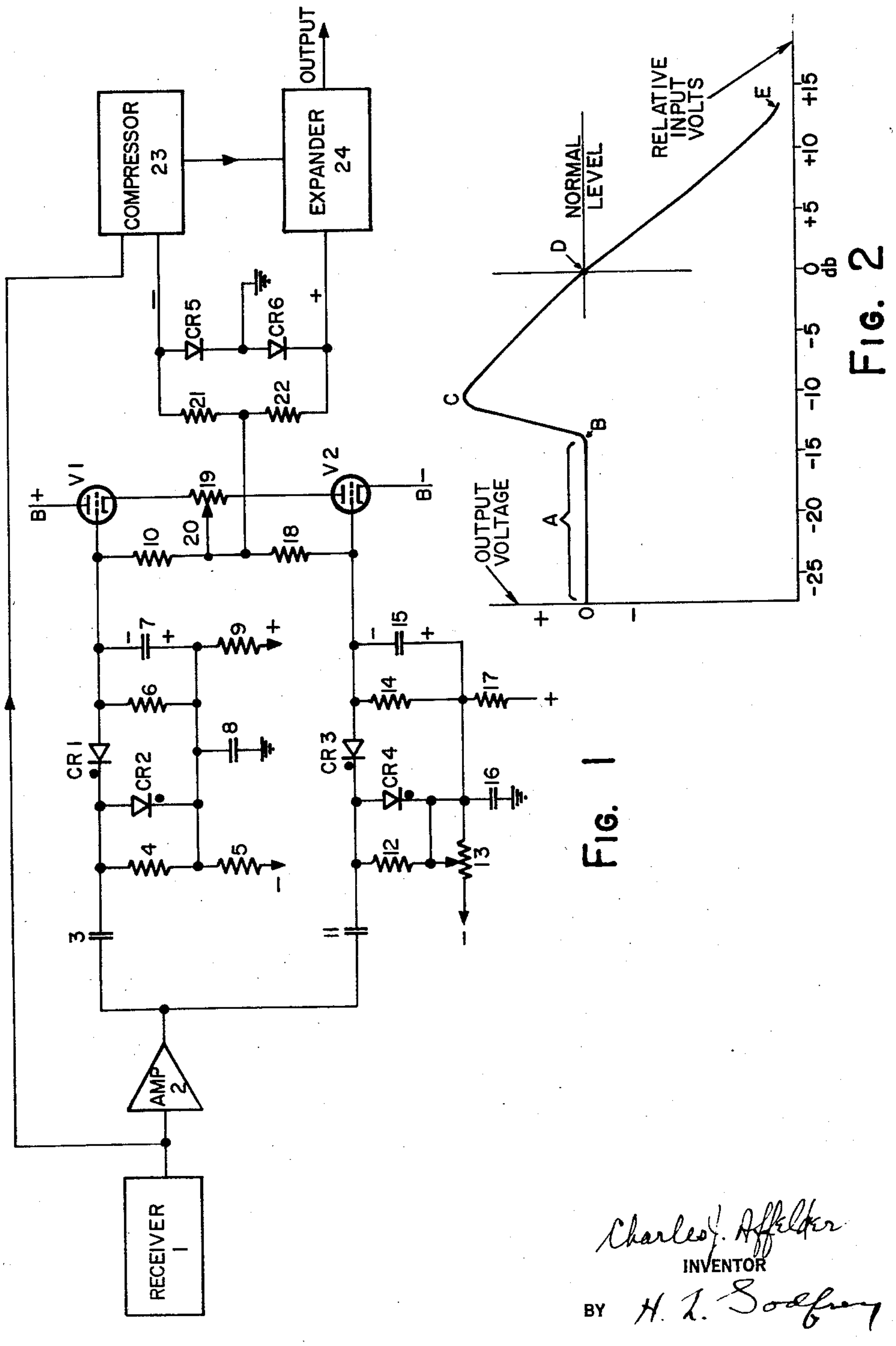
Fig. 1 is a circuit diagram of a device employing the basic principles of the invention.
Fig. 2 is a curve illustrating the action of the control circuit.

Generally, in long distance transmission of short wave radio programs of music and speech, a serious problem exists of maintaining the desired signal level at the ultimate receiving site. Because of the inherent attenuation, fading, etc., the signal to be received will be far from uniform.

The most practical solution is to set up short wave relay bases, where the program is received, amplified and retransmitted at a higher level, so that a substantially uniform and readable signal will be received at the intended site. However, in practice this solution is met with difficulty. The relay receiver must be capable of selecting the desired program and providing a constant output for retransmission. In localities where noise levels are high, and because of the high noise levels usually present in relayed signals, the conventional compressor and gain control circuit is unsuitable.

In order to afford expansion, as well as compression, the usual compressor must be operated so that it is compressing, more or less, at all times, except when there is no program. With the low signal-to-noise ratios prevailing in the outputs of relay receivers such operation would cause the gain to rise to maximum during breaks in transmission, with objectionably intense noise prevailing at these times. Manual audio gain control is impractical, since this would generally require an operator's undivided attention for each active program channel being relayed.

With the foregoing as a general background, the invention will now be described.

With reference to Fig. 1, the desired program is selected by receiver 1 and applied to amplifier 2, which acts as a driver for the following control circuit. The output of amplifier 2 is divided and applied to the crystal rectifier voltage doubling circuits of CR1–2 and CR3–4 and the associated timing circuits 6–7 and 14–15 through blocking condensers 3 and 11 respectively.

The diodes of CR3–4 have a positive delay bias which is adjusted to such value as to eliminate action for inputs of less than approximately 15 decibels (db) below normal signal level. This bias is applied across potentiometer 13 and 17 as indicated. Thus for signal inputs greater than 15 db below normal level the diodes CR3–4 charge condenser 15 in such a manner that a negative voltage is applied to the grid of V–2.

The diodes of CR1–2 have a positive delay bias, which is adjusted to a greater value than that of CR3–4, so as to eliminate action for signal inputs of less than approximately 10 db below normal signal level. This bias is applied across the resistors 5 and 9 as indicated. Thus for signal inputs greater than 10 db below normal level the diodes CR1–2 charge condenser 7 in such a manner that a negative voltage is applied to the grid of V–1.

The threshold points of 15 db and 10 db below normal level are to be considered as illustrative only and not to be construed as limiting in any respect. The threshold or delay bias on CR3–4 may be selected as desired by varying the tap on potentiometer 13.

As will be more apparent hereinafter, the output circuit of amplifier 2 should be arranged so as to provide the proper range of separate voltages for satisfactory operation of the two peak rectifier diode circuits. A simple expedient is to use an autotransformer in the plate circuit to provide additional amplification for the CR1–2 circuit. Then by properly selecting the delay bias the action to be explained hereinafter will be obtained.

The triodes V1 and V2 are connected in series through potentiometer 19, the plate of V1 being connected to a suitable B+ positive voltage supply, and the cathode of V2 being connected to a suitable B— negative voltage supply. Resistors 10 and 18 are connected between the grids of V1 and V2, and the variable tap 20 of potentiometer 19 is connected to the junction of resistors 10, 18. The output of the series triodes V1 and V2 is taken from the variable tap 20.

In the static, no signal, condition, triodes V1 and V2 are conducting and act as a voltage divider between the negative and positive supply voltages. By varying the tap 20, it is readily apparent that a point may be found which is substantially at zero voltage with respect to ground potential. This zero output voltage is applied to the diodes CR5 and CR6 through the respective resistors 21, 22. These diodes function to apply the proper control voltages to the compressor 23 and expander 24 in a manner to be hereinafter explained. Compressor 23 and expander 24 may be of any conventional type, such as for example the expander-compressor circuit of U.S. Patent 2,615,999 to Culicetto.

The output of receiver 1 is also directly applied to compressor 23, wherein the proper compression will be accomplished, the output being applied to expander 24.

The action of the control circuit will be apparent by reference now to Fig. 2. For signals below the selected level of 15 db below the normal signal level, the output of the control circuit is in the region defined by the letter A, since the signal input is insufficient to overcome the initial delay bias on diodes CR3–4.

As the input level increases the delay bias of CR3–4 is overcome, and condenser 15 charges, making the grid of V2 negative. A negative voltage on the grid causes a corresponding decrease in plate current and an increase in plate voltage. Thus the voltage at the tap 20 (output voltage) starts to rise. This initial threshold point at which the output starts to increase is designated "B" on the curve of Fig. 2, and is set by adjusting the delay bias applied to CR3–4. The increasing input level causes a corresponding increase in control voltage until the delay bias of diode CR1–2 is reached, indicated at point C on the curve, at which time, condenser 7 starts to charge making the grid of V1 negative. A negative voltage on the grid causes a similar decrease of voltage at the cathode (plate voltage is rising) and the voltage at the tap 20 starts decreasing, toward the point D. As the input signal further increases toward the normal signal level, the voltage at tap 20 decreases until point D on the curve is reached. At this time the two negative biases on the triodes V1 and V2 have equalized their respective drops and the output is again at substantially zero potential. Any further increase in the input signal level, causes a further drop at the tap 20, into the region D–E of the curve.

By selecting the proper difference in input voltages applied to diodes CR1–2 and CR3–4 and their respective delay biases, the increasing input signal causes a greater negative voltage at the grid of triode V2 than at the grid of triode V1, thus attributing to the unbalance between the points D and E on the curve of Fig. 2.

Once the control circuit has gone through the above action, and of course, provided the input signal does not fall below 15 db down from normal level, the output gain control voltage will vary around point D, which point has been pre-selected as the normal signal level bias.

The output of the control circuit is applied to the two diodes CR5, CR6, which act as clamping diodes to obtain separate sources of control voltage for operation of the compressor and expander amplifiers, 23 and 24.

The particular connection of the receiver output through the compressor and expander, and the specific illustration of the control circuit should in no way be understood as limiting the invention. The arrangement shown is preferred since the compressor 23 operates as the usual gain controlled amplifier, when the output of the control circuit is negative. On the other hand, expander 24 operates as a straight amplifier when the output control voltage is positive.

Other arrangements of the controlled circuits are readily apparent. For example, by simply shifting the reference voltage from zero to some selected positive value the output at tap 20 may be adjusted to vary about some definite positive value. Then by simple inversion a negative control signal which varies about a fixed point may be obtained for application to a compressor, and thereby keep the program level under control and have all the advantages of the present invention. The resultant curve will be substantially the same as in Fig. 2, but with the output reference shifted up into the positive region.

Thus, in accordance with the principles of the present invention, the disadvantages of known gain control systems are eliminated. For no program signal and normal program signal levels, the gain control is the same. For program signal levels below normal, the gain is increased, and for levels above normal, the gain is decreased, thereby automatically maintaining a steady audio level.

It is to be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination with an amplifier circuit which is to be controlled, a gain control circuit comprising, a first circuit means responsive to a first predetermined signal level for providing a first negative voltage for signal levels in excess of said first predetermined signal level, second circuit means responsive to a second predetermined signal level for providing a second negative voltage for signal levels in excess of said second predetermined level, said second predetermined signal level being greater than said first predetermined signal level and both said predetermined signal levels being less than the normal signal level, third circuit means responsive to said first and second negative voltages, and so constructed and arranged as to provide an increasing gain control voltage in response to said first negative voltage, a decreasing gain control voltage in response to said second negative voltage, and a substantially constant level control voltage for conditions of normal signal input, as well as, for the condition of no signal input and means for applying the respective voltage to said amplifier circuit to maintain the input signal at substantially constant level.

2. An audio level governing circuit for maintaining the level of a receiver audio channel substantially constant at a predetermined normal level, comprising a first diode delay circuit for providing a first negative voltage in response to signal inputs having a first predetermined level, a second diode delay circuit for providing a second negative voltage in response to signal inputs having a second predetermined level, said first predetermined level being below said second predetermined level, and both said levels being below said normal level, a first and second grid controlled tubes connected in series, the plate of the first tube connected to the cathode of the second tube, means for connecting the first diode delay to said first tube, means for connecting the second diode delay to said second tube, whereby the plate voltage of said first tube increases in response to said first negative voltage and decreases in response to said second negative voltage and means for balancing the output of said grid controlled tubes at no signal input condition which balanced output is of substantially equal magnitude for normal signal input condition.

3. A receiver gain control circuit comprising means for amplifying a received signal with respect to a predetermined normal input signal level, means for deriving a first voltage in response to a first input signal level which is substantially below said normal signal level, means for deriving a second voltage in response to an input signal level which is greater than said first input signal level and less than said normal signal level, and means for combining said first and second voltages to provide a control voltage which increases for input signals below said normal signal level, decreases for input signals above said normal signal level is of substantial constant level for conditions of no signal input and normal signal input.

4. A receiver gain control circuit, comprising a first triode, a potentiometer and a second triode connected in series between a source of low and high voltage source in the order named, a resistive network connected between the grids of said triodes and said potentiometer, a first delay means connected to the grid of said first triode, a second delay means connected to the grid of said second triode, means for connecting a program signal to be controlled to said gain control circuit and to an amplifier, and means for connecting the output of said series triodes to said amplifier including means for adjusting the output of said triodes, said delay means and said adjusting means being so constructed and arranged as to provide the same output control voltage in the presence of the normal level of program input as for a condition of no program input, further providing an increasing output control voltage when the input signal falls below said normal level, and a decreasing output control voltage when the input signal rises above said normal level.

5. An audio gain control circuit comprising an audio amplifier circuit the gain of which is to be controlled, a voltage divider circuit, a voltage source connected to said divider circuit in such manner that a point on said divider is at substantially zero or ground potential, means for connecting said amplifier to said point, delay means for deriving a first voltage in response to an input audio signal above a first predetermined level, delay means for deriving a second voltage in response to an input audio signal above a second predetermined level, said second level being greater than said first level, and means for connecting said first and second voltages to said voltage divider, whereby the voltage at said point varies from a positive value for signals below the normal input level, through zero or ground potential for signals of normal level to a negative value for signals above the normal input level.

6. A receiver gain control circuit comprising means for amplifying a received signal with respect to a predetermined normal input signal level, means for deriving a first voltage in response to a first input signal level which is substantially below said normal signal level, means for deriving a second voltage in response to an input signal level which is greater than said first input signal level and less than said normal signal level, and means for combining said first and second voltages to provide a control voltage which increases for input signals below said normal signal level and decreases for input signals above said normal level, said combining means comprising a pair of grid controlled tubes connected in series, and means in the cathode to plate circuits of said tubes for adjusting the output thereof.

7. A receiver gain control circuit comprising means for amplifying a received signal with respect to a predetermined normal input signal level, means for deriving a first voltage in response to a first input signal level which is substantially below said normal signal level, means for deriving a second voltage in response to an input signal level which is greater than said first input signal level and less than said normal signal level, and means for combining said first and second voltages comprising a pair of triodes connected in series through a variably tapped potentiometer, a resistor connected to the grid of each of said triodes and to the free end of the other resistor, means connecting the free ends of said resistors to the variable tab of said potentiometer for adjusting the output of said triodes, and an output circuit connected to said connecting means for deriving control voltage which has approximately the same value for no signal condition as for normal signal level, which decreases in response to input signals above said normal signal level and which increases for input signals below said normal signal level.

References Cited in the file of this patent

UNITED STATES PATENTS

| | | |
|---|---|---|
| 2,156,846 | Getaz | May 2, 1939 |
| 2,462,452 | Yates | Feb. 22, 1949 |
| 2,507,695 | Dean | May 16, 1950 |
| 2,615,999 | Culicetto | Oct. 28, 1952 |
| 2,758,205 | Lubkin | Aug. 7, 1956 |
| 2,768,249 | Rockwell | Oct. 23, 1956 |